United States Patent [19]

Riediger et al.

[11] 4,434,680
[45] Mar. 6, 1984

[54] PLANETARY STEERING DIFFERENTIAL

[75] Inventors: Craig W. Riediger, Pekin; James E. Winzeler, East Peoria, both of Ill.

[73] Assignee: Caterpillar Tractor Co., Peoria, Ill.

[21] Appl. No.: 262,054

[22] PCT Filed: Sep. 2, 1980

[86] PCT No.: PCT/US80/01126
§ 371 Date: Sep. 2, 1980
§ 102(e) Date: Sep. 2, 1980

[87] PCT Pub. No.: WO82/00867
PCT Pub. Date: Mar. 18, 1982

[51] Int. Cl.³ .................. F16H 37/06; F16H 1/42
[52] U.S. Cl. .................................... 74/682; 74/687;
74/714; 74/705; 74/720; 74/720.5
[58] Field of Search ............... 74/687, 674, 675, 681,
74/682, 705, 710, 720, 720.5, 714

[56] References Cited

U.S. PATENT DOCUMENTS

| | | | |
|---|---|---|---|
| 1,401,221 | 12/1921 | White | 74/691 |
| 1,423,940 | 7/1922 | Jett | 180/6.66 |
| 2,196,368 | 4/1940 | Thomson | 74/675 |
| 2,377,354 | 6/1945 | Merritt | 74/705 |
| 2,408,507 | 10/1946 | Brown | 74/675 |
| 2,780,299 | 2/1957 | Matson | 74/687 |
| 3,199,376 | 8/1965 | De Lalio | 74/687 |
| 3,383,953 | 5/1968 | Christenson | 74/687 |
| 3,392,602 | 7/1968 | Frost | 74/720.5 |
| 3,439,559 | 4/1969 | Binger et al. | 74/720.5 |
| 3,545,303 | 12/1970 | Whelahan | 74/720.5 |
| 3,583,256 | 6/1971 | Livezey | 74/687 |
| 3,590,658 | 7/1971 | Tuck | 74/687 |
| 3,596,535 | 8/1971 | Polak | 74/720.5 |
| 3,815,698 | 6/1974 | Reed | 74/720.5 |
| 4,215,755 | 8/1980 | Waterworth et al. | 74/720.5 |
| 4,258,585 | 3/1981 | Orshansky, Jr. et al. | 74/687 |
| 4,327,603 | 5/1982 | Zaunberger et al. | 74/720.5 |

OTHER PUBLICATIONS

"Tank Steering Mechanisms", *The Engineer*, Ogorkiewicz, R. M., Mar. 3, 1967.
"Tank Steering Mechanisms", *The Engineer*, Ogorkiewicz, R. M., Mar. 10, 1967.

*Primary Examiner*—Allan D. Herrmann
*Assistant Examiner*—D. Wright
*Attorney, Agent, or Firm*—Charles E. Lanchantin, Jr.

[57] ABSTRACT

Continuously driven vehicle steering differentials have heretofore been too complex and have undesirably incorporated a second cross shaft for counter-rotating a pair of oppositely located planetary elements. The planetary steering differential (10) overcomes these deficiencies by including first, second and third interconnected planetary mechanisms (12,14,16) for rotating a pair of output members (48,52) in the same direction and at the same speed in response to rotation solely of a first input member (57) and holding a second input member (63) stationary, and for rotating the output members (48,52) in opposite directions at the same speed in response to rotation solely of the second input member (63) and holding the first input member (57) stationary. The first input member (57) is driven by a transmission (58), and the second output member (63) is driven by a reversible steering motor (66).

41 Claims, 13 Drawing Figures

PLANETARY STEERING DIFFERENTIAL

DESCRIPTION

1. Technical Field

This invention relates generally to a differential for a vehicle cross drive or the like, and more particularly to a compact and simplified planetary steering differential.

2. Background Art

A large number of earthmoving tractors have been developed which have incorporated either clutch-and-brake steering mechanisms or geared steering mechanisms. In both of these classifications, however, the drive to the opposite tracks is discontinuous when making turns. This results in poorer operation of the vehicle than is desired during turns in marginal ground conditions.

In some seasons of the year, for example, logging industry tractors with conventional clutch-and-brake steering mechanisms cannot be maneuvered to provide useful work because when one of the steering clutches is disengaged the power to that side of the tractor is interrupted. The other side of the tractor then has to pull the total drawbar load to maintain momentum. Unfortunately, soil strength under only one side is often inadequate to carry the total load so the powered track shears the soil and loses traction. Such a loss is a particular disadvantage when it comes to making relatively small steering corrections. On the other hand, clutch-and-brake steering mechanisms are widely used because they perform well in straight-ahead work applications and are simple in construction.

In geared steering mechanisms, rather than disconnecting one track and/or bringing that track to rest, one track is driven at a lower speed than the other by having additional gear sets in the drive to each track. But these mechanisms are complex and costly in construction because duplicate planetary sets, gears, brakes and/or clutches are typically provided at both sides. Furthermore, since these mechanisms are discontinuous a lower mean track speed is provided during a turn.

Another major group of steering mechanisms includes differential mechanisms in which drive is transmitted continuously to both tracks. The simplest form thereof is a braked differential, but these are rarely used because of relatively large power losses at the steering brake. Many of the disadvantages of the braked differential are obviated by controlled differentials. In such mechanisms engine power is not wasted in the steering brakes since power is merely transferred from the inner track to the outer track. But these also have disadvantages. One major disadvantage is that when the brakes are off these mechanisms act as simple differentials so that they depend on the reaction between the track and the ground to be equal for straightahead operation. Since this is often not true the vehicle tends to drift so that frequent corrections are required. Moreover, if one track loses traction the drive to the opposite track is reduced.

A good many of the above mentioned problems can be overcome by the use of double differentials, triple differentials and equivalent mechanisms which usually can counter rotate the opposite output members for spot turns. Typically, two differentials or their equivalent are arranged in parallel with their output shafts interconnected by gearing. Usually, a main drive power path is provided to one of the differentials and a steering drive power path is provided to the other one of the differentials. In some instances the steering input shaft has been driven by a hydrostatic pump and motor system, with the ability to hold the steering input shaft stationary to prevent differential action and to assure straight ahead operation of the tractor, military tank or the like in an effective manner. One major deficiency thereof is that dual cross shafts and associated gearing are required so that the construction is not only complex and costly, but also an unnecessarily large housing is required for containment of the components. Another related deficiency is that most of these differential mechanisms have a dual power path steering input, which usually involves rotating one gear at one side of the cross drive at the same speed but in the opposite direction to a counterpart gear on the other side.

Thus, what is desired is a compact steering differential having continuous drive capability to the opposite output members, a relatively simple construction arranged along a single axis, a single steering input power path, and preferably a built-in reduction or speed stepdown capability for better matching the transmission input speed without the need for an additional drive train.

The present invention is directed to overcoming one or more of the problems as set forth above.

DISCLOSURE OF THE INVENTION

In one aspect of the invention a planetary steering differential is provided having first and second input members, first and second output members, and planetary means for rotating the first and second output members in the same direction and at the same speed when only the first input member is rotated and the second input member is held stationary, and for rotating the first and second output members in opposite directions at the same speed when only the second input member is rotated and the first input member is held stationary.

When the first and second input members of the instant differential are powerably driven at the same time by suitable transmission means and steering means respectively, the average speed of the output members is proportional to the speed of the transmission means, and the difference in the speed of the output members is proportional to the speed of the motor means.

In accordance with another aspect of the invention a planetary steering differential is provided having three planetary mechanisms, each having first, second and third planetary elements, and one of the elements of the second and third planetary mechanism serving as a first input and another as a second input. Advantageously, transmission means are provided for rotating the first input and thereby an output element of each of the first and third planetary mechanisms at equal rates of speed for straight-ahead vehicle operation in response to holding the second input, and steering means are provided solely through a single input power path for rotating the second input and thereby the same output elements at different rates of speed for turning vehicle operation.

In accordance with a further aspect of the invention a planetary steering differential includes a first planetary mechanism having a first ring gear, a first sun gear, and a first planet carrier, and a second planetary mechanism having a second ring gear, a second sun gear, and a second planet carrier, the first ring gear being connected to the second planet carrier, the first and second sun gears being connected for joint rotation, and the first sun gear and the second planet carrier serving as output members in response to powered rotation of one of the first planet carrier and the second ring gear.

Basically, however, a family of three interconnected planetary mechanisms is presented wherein one planetary element is powerably driven by a transmission and one other planetary element is powerably driven by a variable speed and reversible steering motor. Operation of the steering motor in one direction of rotation causes the speed of the left output member to increase and the right output member to simultaneously decrease the same amount for a right turn, while rotation in the opposite direction causes an opposite reaction for a left turn. The first planetary mechanism in each embodiment in the family has a grounded or stationary planetary element and is provided for speed control. This greatly simplifies the construction of the differential, beneficially provides continuous power to the opposite sides of the vehicle during a turn, and allows straight-ahead operation without drift. It is especially valuable in a vehicle requiring either frequent small steering corrections or repetitive spot steering type operation under adverse footing conditions.

BEST MODE FOR CARRYING OUT THE INVENTION

Figure 1:
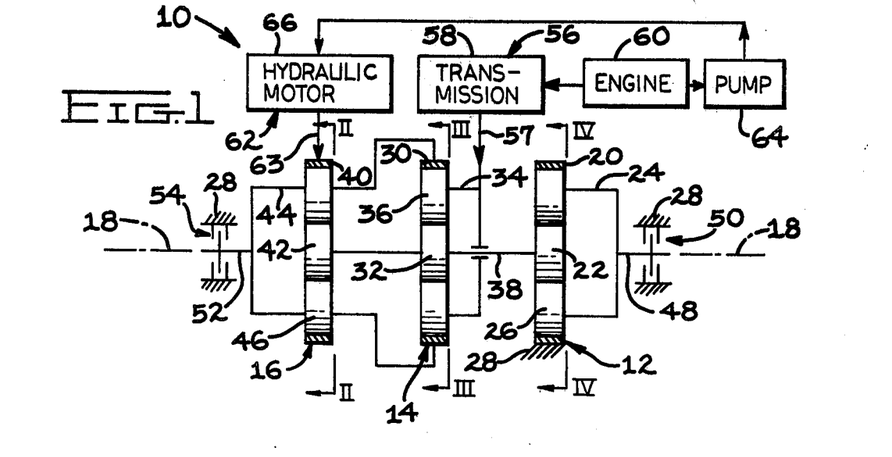
FIG. 1 is a diagrammatic, elevational view or generalized planetary schematic of one embodiment of the planetary steering differential of the present invention, showing in block form a hydraulic steering motor input and a separate transmission unit associated with the planetary input members thereof and illustrating the general power path associated with these units.

Referring initially to the diagrammatic drawing of FIG. 1, a planetary steering differential 10 is shown in simplified block-like form which has first, second and third interconnected planetary mechanisms 12, 14 and 16 respectively aligned along a central vehicle cross drive axis 18 oriented normal to the usual forward and reverse direction of vehicle travel.

Figures 3, 4:
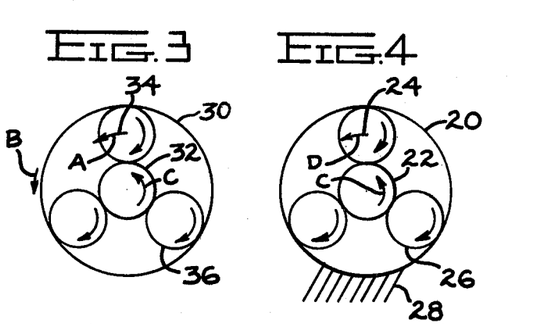
FIG. 3 is a view similar to FIG. 2 taken along line III—III of FIG. 1 and showing the second planetary mechanism thereof.
FIG. 4 is a view similar to FIGS. 2 and 3 taken along line IV—IV of FIG. 1 and illustrating the first planetary mechanism thereof.

The first planetary mechanism 12 includes ring gear, sun gear and planet carrier elements 20, 22 and 24 of the typical type wherein a plurality of similar planet elements 26 are rotatably mounted on the carrier element and are in intermeshing toothed engagement with the ring and sun elements. In the instant embodiment the first planetary mechanism serves as a grounded member train with the ring element being fixedly secured to a differential housing 28, and provides a speed reduction. An end view of the first planetary mechanism, looking from the right side of FIG. 1, is illustrated in FIG. 4.

The second planetary mechanism 14 includes ring gear, sun gear and planet carrier elements 30, 32, 34 and a plurality of planet elements 36 are rotatably mounted on the carrier element. As is illustrated in FIG. 1, the second sun element 32 is directly connected to first sun element 22 by a shaft 38. A diagrammatic end view of the second planetary mechanism is illustrated in FIG. 3.

Figure 2:
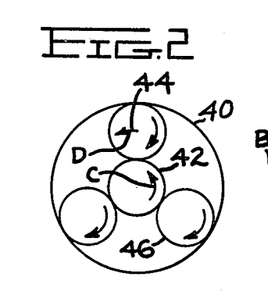
FIG. 2 is a diagrammatic, right end elevational view of the third planetary mechanism of the instant planetary steering differential as taken along the line II—II of FIG. 1, and illustrating the direction of rotation of the elements during a straight-ahead mode of operation.

Similarly, at the left side when viewing FIG. 1 is the third planetary mechanism 16 including ring gear, sun gear and planet carrier elements 40, 42, and 44, and a plurality of planet elements 46 on the carrier element. An end view thereof is shown in FIG. 2. The third planet carrier element 44 is connected for joint rotation with the second ring element 30, as is also the third sun element 42 with the second sun element 32.

The first carrier element 24 on the right side when viewing FIG. 1 serves essentially as the first output member 48, and a conventional service brake assembly 50 can be associated therewith to selectively brake the right side of the vehicle. On the left side the third carrier element 44 serves as the second output member 52 and a similar conventional service brake assembly 54 can selectively connect that element or output member to the differential housing 28 to brake the left side.

Transmission means 56 is desirably provided for powerably rotating at least one element of the second and third planetary mechanism 14, 16 via a single reversible power path or first input member 57. Preferably the transmission means includes a conventional multi or variable speed and reversible transmission 58 driven by an engine 60 as is illustrated in FIG. 1. In the instant example, the transmission is essentially connected to the second carrier element 34 so that that element serves as the primary or first input.

Advantageously, infinitely variable ratio steering means 62 is provided for powerably rotating at least one other element of the second and third planetary mechanisms 14,16 via a single reversible power path or second input member 63. Preferably, such means includes a hydraulic or hydrostatic pump 64 driven by the engine 60, and a corresponding motor 66 which is in fluid communication with the pump and driven by the pump. In the instant example the hydraulic motor 66 is essentially connected to the third ring element 40 which thereby serves as the secondary input to the steering differential 10.

Figure 8:
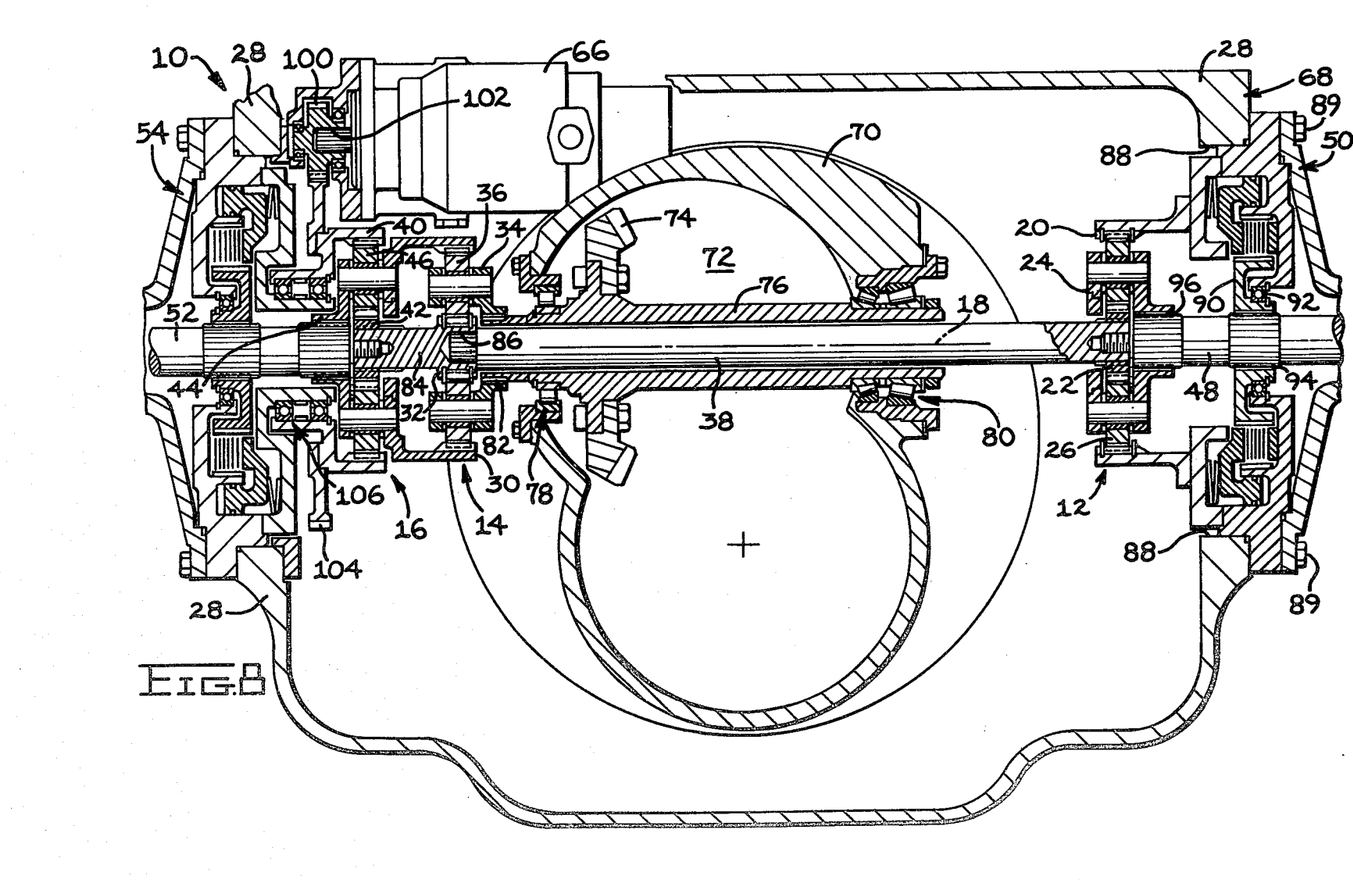
FIG. 8 is a diagrammatic, elevational and sectional view of a planetary steering differential embodying the planetary configuration of FIG. 1, showing in more detail the components thereof as they can be assembled in a vehicle while looking forward from the rear end of the vehicle.

Referring now to FIG. 8, a diagrammatic cross sectional elevation view of one form of the planetary differential 10 described in FIG. 1 is shown installed in a vehicle 68 and looking from the rear of the vehicle. Centrally thereof is a transmission case 70 releasably secured within the differential housing 28, and defining a central chamber 72 in which the multi-speed transmission 58 is contained. Although the conventional transmission is not shown, the output thereof drives a bevel gear 74 releasably secured to a hollow cross shaft 76. The cross shaft is rotatably supported within the transmission case by first and second bearing assemblies 78 and 80, and extends outwardly from the left side of the case when viewing the drawing to provide a spline connection 82 thereat. This spline connection couples the hollow shaft to the second carrier element 34 of the second planetary mechanism 14 to provide the primary input to the differential.

More specifically, the second sun element 32 has an extended body portion 84 defining an internal spline 86, and the center shaft 38 is coupled to the spline and extends rightwardly within the hollow cross shaft 76 to provide the drive to the first planetary mechanism 12. The sun element 22 is shown as being integral with the center shaft. The first ring element 20 is connected to the service brake assembly 50, and this assembly is releasably connected to the differential housing 28 at a cylindrical opening 88 by a plurality of fasteners or bolts 89. In turn, the right side service brake assembly rotatably supports an annular hub 90 by a bearing assembly 92, and the hub supports the right output member or axle shaft 48 at a releasable spline connection 94. Since the right axle shaft is also releasably connected to the first carrier element 24 at a spline connection 96 it may be withdrawn to the right for servicing independently of the service brake assembly. Advantageously, the entire service brake assembly 50, the hub 90 and the first planetary mechanism 12 can be removed for servicing substantially as a modular unit by screwthreaded release of the bolts 89. The shaft 38 can thereafter be removed rightwardly through the opening 88.

The left side service brake assembly 54 has substantially the same construction and convenient serviceability features as the right side. In addition, after the cross shaft 38 is released from the right side via the opening 88, and after the left axle shaft 52 and the second planetary mechanism 14 are moved to the left, the transmission case 70 and transmission 58 contained therein can be withdrawn rearwardly as a unit from within the differential housing 28 through a rearwardly facing opening in the rear wall thereof, not shown.

The bidirectional, variable speed hydraulic motor 66 can be serviced from the top of the differential housing 28. It can be removed independently of an output gear 100 because of a releasable spline connection 102 therebetween. The output gear 100 is in toothed engagement with a larger gear 104 connected to the third ring element 40 and rotatably supported on the service brake assembly 54 by a bearing assembly 106.

ALTERNATE EMBODIMENT

Figure 9:
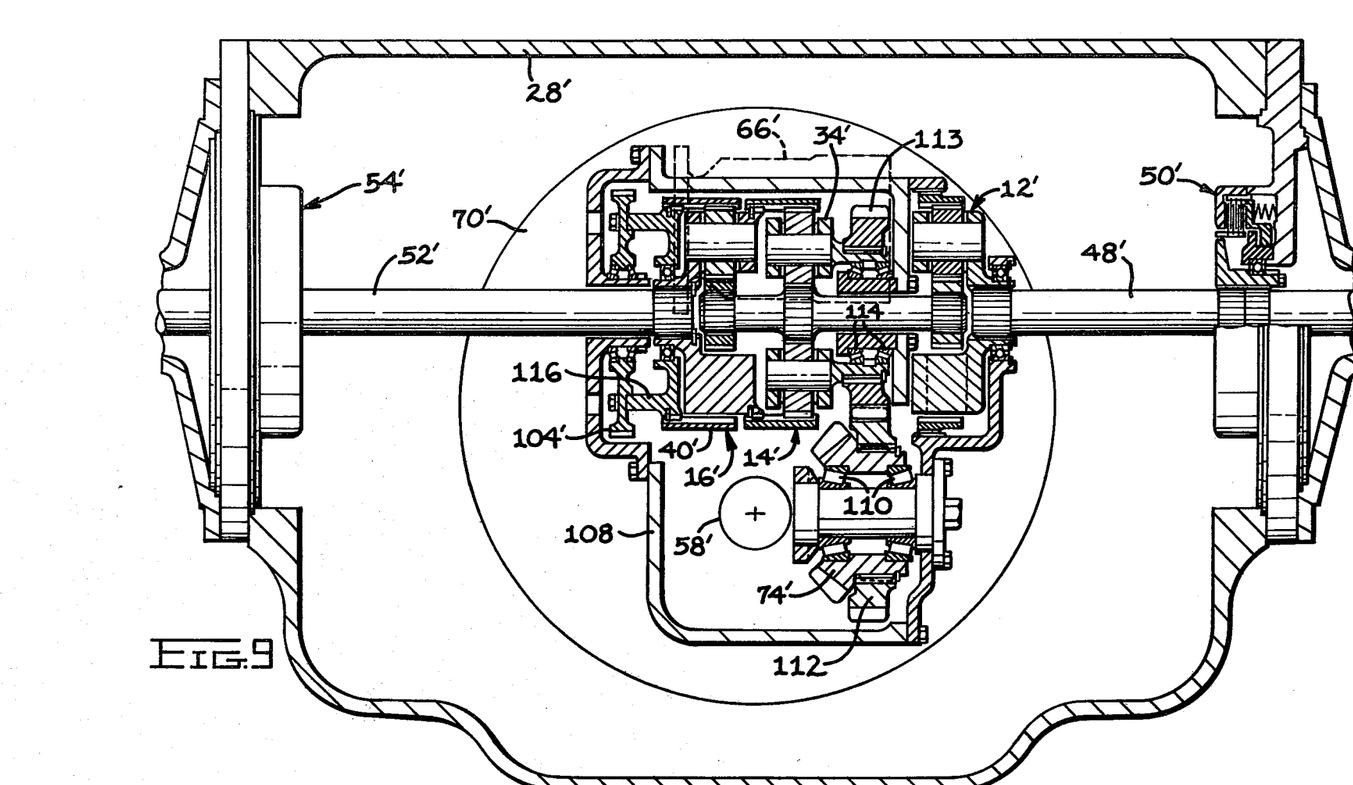
FIG. 9 is a view similar to FIG. 8, embodying the planetary configuration of FIG. 1 but showing a first alternate embodiment assembly of the planetary elements on a vehicle.

While the construction illustrated in FIG. 8 is very desirable as described above, it is also possible to rearrange the components of the steering differential 10 in a central location so that the transmission 58' and all three of the planetary mechanisms 12', 14', and 16' can be removed as a modular unit as may be visualized with reference to FIG. 9. In FIG. 9 elements common to FIGS. 1 and 8 have been shown with similar reference numbers with an added prime indicator for convenient identification. In the alternate embodiment the transmission case 70' is releasably connected to a reduced size differential case 108, and the differential case nestably contains the three planetary mechanisms 12', 14' and 16' and rotatably supports the input bevel gear 74' through an opposed pair of roller bearings 110. A first transfer gear 112 is connected to the input bevel gear for joint rotation and is in driving contact with a second transfer gear 113. The second transfer gear is connected to the second carrier element 34' and is essentially rotatably supported within the differential case 108 as by a second opposed pair of roller bearings 114, and it is this second transfer gear that provides the primary input to the second planetary mechanism 14'. The motor 66' illustrated in broken outline drives the gear 104' to provide the steering input to the third ring element 40' through an intermediate member 116.

In the FIG. 9 construction it is only necessary to withdraw the left and right axle shafts 52', 48' to the left and right respectively in order to subsequently permit the differential case 108 and transmission case 70' to be withdrawn through the rear of the differential housing 28'.

INDUSTRIAL APPLICABILITY

In operation, the planetary steering differential 10 is preferably situated at the rear portion of the vehicle 68 such as an earthmoving tractor in order to place the transverse axis 18 thereof substantially in line with, or near, the axis of the sprockets that drive the left and right endless tracks. Although these latter members are not illustrated in the drawings, it can be appreciated by reference to FIG. 1 that if the left and right output members 52,48 are rotated in the same direction and at the same speed then the vehicle will travel straight-ahead or in reverse in a longitudinal direction. Either mode of operation is achieved by selecting the gear speed and direction of the output of the transmission 58 so that the second carrier element 34 is driven in the desired manner. Simultaneously, the hydraulic motor 66 is selectively positioned in a holding mode of operation to hold the third ring element 40 stationary and to assure that both output members 48,52 will rotate at the same speeds without drift.

Specifically, and with reference to FIG. 3, the second planet carrier element 34 can be rotated in a counterclockwise direction when viewing along the axis 18 from the right side in FIG. 1 by the transmission 58 as is indicated by the letter A. By establishing the number of teeth in the rotating elements of the first, second and third planetary mechanisms 12,14 and 16 at preselected values certain advantages will accrue. This can best be appreciated by selectively establishing the ratio of the number of teeth of the ring gear element divided by the number of teeth of the sun gear element, hereinafter called the e value, such that the e value of the second planetary mechanism 14 minus 1 is equal to the e value of both the first and third planetary mechanisms 12 and 16. For example, the number of teeth in the first planetary mechanism ring and sun elements 20,22 respectively can be 81 and 27, which results in an e value of 3. The number of teeth in the second planetary mechanism ring and sun elements 30,32 can be 80 and 20, which results in an e value of 4. And the number of teeth in the third planetary mechanism ring and sun elements 40,42 can be 81 and 27, which provides an e value of 3.

With the aforementioned 3-4-3 e value relationship, and with the planetary mechanisms 12,14 and 16 interconnected as previously described, the ring element 30 will be forced to rotate in a counterclockwise direction as indicated by the letter B in FIG. 3, but at about $\frac{5}{8}$ of the speed rate of the input. Also, the interconnected sun elements 22, 32, 42 will rotate together in a counterclockwise direction at $2\frac{1}{2}$ times the speed rate of the input as is indicated by the letters C in FIGS. 4, 3 and 2 respectively. The first carrier output element 24 and the third carrier output element 44 will then rotate in a counterclockwise direction at a rate $\frac{5}{8}$ of the input speed as indicated by the letters D in FIGS. 4 and 2. Note that both the first and third ring elements 20,40 are held to achieve this straight-ahead mode of operation.

Figure 5:
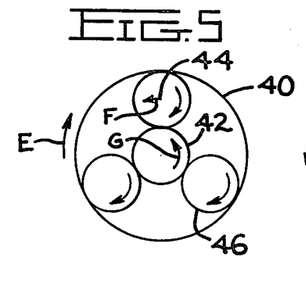
FIG. 5 is a view similar to FIG. 2, only illustrating the direction of rotation and relative speed of the elements during a steering correction.
Figure 6:
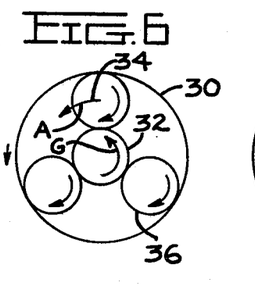
FIG. 6 is a view similar to FIG. 3, with the elements making the same steering correction as FIG. 5.
Figure 7:
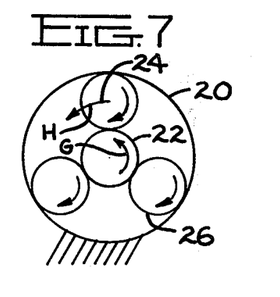
FIG. 7 is a view similar to FIG. 4, with the elements making the same steering correction as FIGS. 5 and 6.

If a steering correction is desired while traveling, the engine driven pump 64 is selectively coupled to the hydraulic motor 66 to drive it in either direction of rotation simultaneously with rotation of the second carrier element 34 by the transmission 58. Assuming that a turn to the left is desired while traveling forward, then the motor will be powered to drive the third ring element 40 in a clockwise direction as is illustrated by the letter E in FIG. 5. This causes a reaction on the planet gear elements 46 such that the speed of the third carrier element 44 is reduced as indicated by the letter F. On the other hand the sun elements 42, 32 and 22 experience a speed increase as indicated by the letter G in FIGS. 5, 6 and 7 with the result that the first carrier element 24 is forced to speed up as indicated by the letter H. Since the speed of the left output member or drive axle 52 decreases and the right output member or drive axle 48 increases a steering correction to the left results.

By reversing the direction of rotation of the hydraulic motor 66 a steering correction to the right can be made. Advantageously, power is continuously supplied to both sides of the vehicle 68 throughout a turn with the planetary steering differential 10, and the average speed of the opposite output members 48,52 remains unchanged and equal to a preselected proportion of the output speed of transmission 58.

In any mode of operation, the service brake assemblies 50,54 can be operated together to brake the vehicle. Such operation is desirably independent of the steering function.

In order for the vehicle 68 to make a spot turn the transmission 58 is selectively controlled to hold the second carrier element 34 stationary. Then the motor can be operated in either direction to force the first and third carrier elements 24 and 44 to rotate in opposite directions at the same speed. Under these conditions the demands on the hydraulic motor can be expected to reach a maximum horsepower rating. However, with the subject differential 10 the size or capacity of the motor need not be equal to the full horsepower rating of the engine 60, but rather only a preselected portion thereof. For example, a motor horsepower rating of about 60% that of the engine is considered practical in one instance.

It is to be appreciated that the motor speed can be selectively controlled within limits to be large enough relative to the transmission input speed to cause any desired speed ratio of the opposite output members to give desired steering correction. Moreover, the output members can even be counterrotated when the transmission input member 57 is being rotated at a preselected speed for a more rapid steering correction.

The differential 10 of FIG. 1 also provides a desirable speed reduction of about 1.6, which can be considered in the range of a moderate reduction level. A greater level of speed reduction, for example a reduction level of about 3.0, can be advantageous in some cases because it could mean that less speed reduction would be required within the final drives and result in a savings in construction complexity and space requirements thereat.

SECOND ALTERNATE EMBODIMENT

Figure 10:
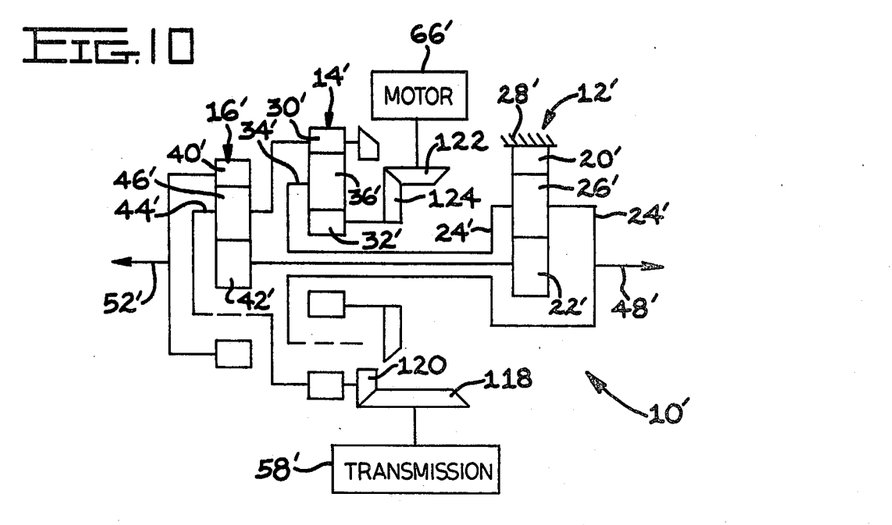
FIG. 10 is a view similar to FIG. 1 of a second alternate embodiment planetary steering differential constructed in accordance with the present invention.

As shown in FIG. 10, a second alternate embodiment planetary steering differential 10' includes first, second and third interconnected planetary mechanisms 12', 14' and 16' respectively, so that it bears a family resemblance to the embodiment of FIG. 1. Each of the first, second and third planetary mechanisms have ring, sun, carrier and planet elements identified by reference numerals similar to those employed during the description of the first embodiment, only with the addition of a prime indicator. However, the connections are different and the e values are different to provide certain advantages. The first planet carrier element 24' is connected for joint rotation with the second planet carrier element 34', the first sun gear element 22' is connected to the third sun gear element 42' for joint rotation, and the second ring gear element 30' is connected for joint rotation with the third planet carrier element 44'.

Both the transmission 58' and the motor 66' are connected to the same planetary mechanism 14' via pinion gears and bevel gears 118,120 and 122,124 respectively, and with the bevel gears 120 and 124 being respectively connected for joint rotation with the second ring element 30' and the second sun element 32'. This construction can have certain advantages by better accommodating the differential 10' and particularly the location of the transmission and motor input elements 118, 122 to the space requirements of the vehicle. Moreover, the first carrier element 24' provides the right power output and the third ring element 40' provides the left power output, and this is preferred generally over a sun gear power output. The respective e values for the first, second and third planetary mechanisms 12', 14', 16' can be 2, 2 and 3 to provide gearing elements of a desirable size and a speed reduction at the output elements 24',40' of about 1.5:1 with respect to the input element 30'.

THIRD ALTERNATE EMBODIMENT

Figure 11:
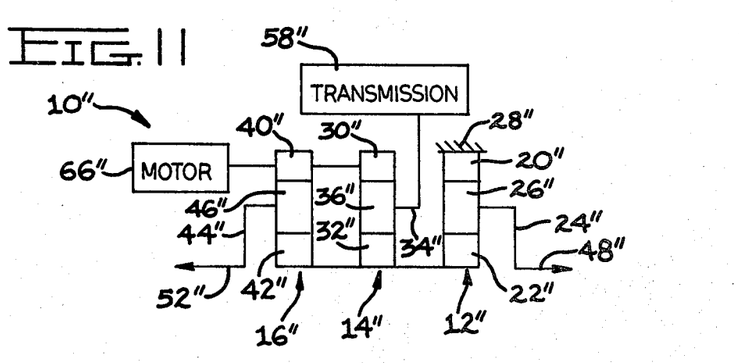
FIG. 11 is a view similar to FIGS. 1 and 10, only illustrating a third alternate embodiment.

A third alternate embodiment planetary steering differential 10" is shown in FIG. 11 having elements similar to those employed above identified with similar reference numerals, only with the addition of double prime indicators. In this construction the three sun gear elements 22", 32" and 42" are connected together for joint rotation, and the two ring gear elements 30" and 40" are connected together for joint rotation so that only two separate pieces need be manufactured to effect a considerable cost savings. Yet, the desirable carrier element output members are retained, and a desirable range of e values can be selected to provide the required ratios. For example, e values of 4, 2 and 4 can be chosen for the respective mechanisms 12", 14" and 16" to provide a reduction level of 1.67:1 in the differential 10".

FOURTH ALTERNATE EMBODIMENT

Figure 12:
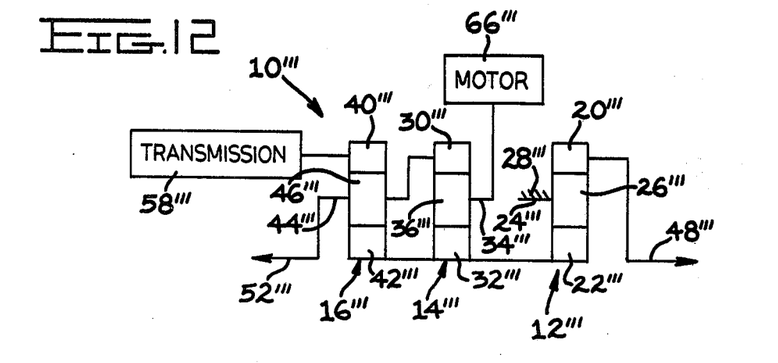
FIG. 12 shows a fourth alternate embodiment of the planetary steering differential of the present invention.

A fourth alternate embodiment planetary steering differential 10''' is shown in FIG. 12 which has the desirable feature of a increased speed reduction. In this instance the first planetary mechanism 12''' has a different grounded element, namely the first planet carrier element 24''' is continually grounded to the stationary housing 28''' and the ring element 20''' serves as the right output member. The sun gears 22''', 32''' and 42''' are connected together for joint rotation, and the left output member is connected for joint rotation with the third planet carrier 44''' and also the second ring gear element 30'''. The transmission 58''' is coupled to the third ring gear element 40''' in this construction, and the steering motor 66''' is coupled to the second carrier element 34'''. With e values of 3, 3 and 2 for the first, second and third planetary mechanisms 12''', 14''' and 16''' respectively, a relatively high speed reduction capability of 3.0:1 is effected. It also features manufacturing economies similar to those mentioned above with respect to FIG. 11.

FIFTH ALTERNATE EMBODIMENT

Figure 13:
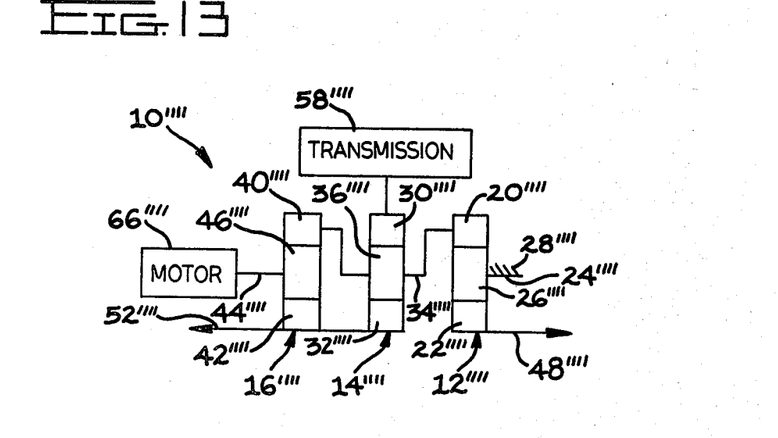
FIG. 13 illustrates a fifth alternate embodiment of the present invention.

FIG. 13 illustrates a fifth alternate embodiment planetary steering differential 10'''' which features a negative overdrive.

The first carrier element 24'''' is continually grounded to the housing 28'''' and the right output is by way of the first sun gear element 22''''. The first ring element 20'''', the second carrier element 34'''' and the third ring element 40'''' are connected together for joint rotation, and the second and third sun gear elements 32'''' and 42'''' are connected together to provide the left output. Transmission 58'''' drives the second ring element 30'''' and steering motor 66'''' drives the third planet carrier element 44''''. With the respective e values being 4, 3 and 4, a speed reduction of $-0.67$ can be effected. In other words, if the transmission drives the ring element 30'''' at 1 rpm in a first direction of rotation with such construction then the output members 48'''' and 52'''' are driven at $1\frac{1}{2}$ rpm in a direction opposite to the first direction of rotation.

Thus it can be recognized that the planetary steering differentials 10, 10', 10'', 10''' and 10'''' present a family of differentials having a single transmission input power path and a particularly desirable single steering motor input power path to planetary means 12, 14, 16. This avoids the need for an additional cross shaft and the dual steering motor input power paths required of a great many of the prior art planetary steering differentials. Basically, three planetary mechanisms achieve rotation of the opposite output members in the same direction and at the same speed in response to holding the single steering input member and driving the transmission input member for straight ahead operation, or achieve rotation of the output members in opposite directions at the same speed in response to holding the transmission input member and driving the single steering input member for effecting a spot turn. This is accomplished in a compact and economical package, which package may be conveniently tailored in its speed reduction capability and construction to best match a particular vehicle's requirements.

Other aspects, objects and advantages of this invention can be obtained from a study of the drawings, the disclosure and the appended claims.

What is claimed is:

1. A planetary steering differential (10) adapted to be driven in use by a transmission (58) and a steering motor (66), comprising:
   a first input member (57) adapted to be driven by the transmission (58);
   a second input member (63) adapted to be driven by the steering motor (66);
   first and second output members (48,52);
   planetary means (12,14,16) for rotating said first and second output members (48,52) in the same direction and at the same speed in response to rotation solely of said first input member (57) and holding said second input member (63) stationary with the speed of the first and second output members (48,52) being reduced from the speed of the first input member (57), and for rotating said first and second output members (48,52) in opposite directions at the same speed in response to rotation solely of said second input member (63) through a single steering input power path and holding said first input member (57) stationary, said planetary means (12,14,16) including first, second and third interconnected planetary mechanisms (12,14,16) individually having single ring gear, sun gear and planet carrier elements (20,22,24,30,32, 34,40,42,44), one of said elements (30,32,34,40,42,44) of said second and third planetary mechanisms (14,16) being connected to said first input member (57) and another one being connected to said second input member (63), said planetary mechanisms (12,14,16) being arranged on and interconnected solely along a common central axis (18).

2. A planetary steering differential (10) comprising:
   first and second input members (57,63);
   first and second output members (48,52);
   planetary means (12,14,16) for rotating said first and second output members (48,52) in the same direction and at the same speed in response to rotation solely of said first input member (57) and holding said second input member (63) stationary with the speed of the first and second output members (48,52) being reduced from the speed of the first input member (57), and for rotating said first and second output members (48,52) in opposite directions at the same speed in response to rotation solely of said second input member (63) through a single steering input power path and holding said first input member (57) stationary, said planetary means (12,14,16) including a first, second and third interconnected planetary mechanisms (12,14,16) individually having ring gear, sun gear and planet carrier elements (20,22,24,30,32,34,40, 42,44), one of said elements (30,32,34,40,42,44) of said second and third planetary mechanisms (14,16) being connected to said first input member (57) and another one being connected to said second input member (63), and wherein one of said elements (20,22,24) of said first planetary mechanism (12) is a continuously stationary reaction member.

3. The planetary steering differential (10) of claim 2 wherein said ring gear element (20) of the first planetary mechanism (12) is continuously held stationary.

4. The planetary steering differential (10) of claim 1 wherein said planet carrier element (24) of the first planetary mechanism (12) is stationary.

5. The planetary steering differential (10) of claim 1 wherein said one of said elements (30,32,34, 40,42,44)

connected to said first input member (57) is a planet carrier.

6. The planetary steering differential (10) of claim 1 wherein said one of said planetary elements (30, 32, 34, 40, 42, 44) connected to said first input member (57) is one of the ring gear elements (30,40).

7. The planetary steering differential (10) of claim 1 wherein said sun gear elements (22, 32, 42) of each of said planetary mechanisms (12, 14, 16) are interconnected for joint rotation.

8. The planetary steering differential (10) of claim 1 wherein said another one of said planetary elements (30, 32, 34, 40, 42, 44) connected to said second input member (63) is a ring gear.

9. The planetary steering differential (10) of claim 1 wherein said another one of said planetary elements (30, 32, 34, 40, 42, 44) connected to said second input member (63) is one of the sun gear elements (32,42).

10. The planetary steering differential (10) of claim 1 wherein said another one of said planetary elements (30, 32, 34, 40, 42, 44) connected to said second inut member (63) is one of the planet carrier elements (32,42).

11. The planetary steering differential (10) of claim 1 wherein said first and second output members (48,52) are connected to said planet carrier elements (24,44) of said first and third planetary mechanisms (12,16).

12. The planetary steering differential (10) of claim 1 wherein said first and second output members (48,52) are respectively connected to said planet carrier (24) and said ring gear (40) of said first and third planetary mechanisms (12,16).

13. The planetary steering differential (10) of claim 1 wherein said first and second output members (48,52) are respectively connected to said ring gear (20) and said planet carrier (44) of said first and third planetary mechanisms (12,16).

14. The planetary steering differential (10) of claim 1 wherein said first and second output members (48,52) are connected to said sun gear elements (22,42) of said first and third planetary mechanisms (12,16).

15. The planetary steering differential (10) of claim 1 wherein said first input member (57) is connected to said planet carrier (34) of said second planetary mechanism (14), and said second input member (63) is connected to said ring gear (40) of said third planetary mechanism (16).

16. The planetary steering differential (10) of claim 15 wherein said first output member (48) is connected to said planet carrier (24) of said first planetary mechanism (12), and said second output member (52) is connected to said planet carrier (44) of said third planetary mechanism (16).

17. A planetary steering differential (10) comprising:
first, second and third interconnected planetary mechanisms (12,14,16) individually having ring gear, sun gear and planet carrier elements (20,22,24,30,32,34,40,42,44), a first one of said elements (20,22,24) of said first planetary mechanism (12) being a continuously stationary reaction member, and a first one of said elements (30,32,34,40,42,44) of said second and third planetary mechanisms (14,16) being a first input (30/34/40) and a second one of said elements (30,32,34,40,42,44) of said second and third planetary mechanisms (14,16) being a second input (32/34/40/44);
transmission means (56) for powerably driving said first input (30/34/40) at a preselected speed and thereby rotating a third one of said elements (20,22,24) of said first planetary mechanism (12) and a third one of said elements (40,42,44) of said third planetary mechanism (16) at equal rates of output speed below said preselected speed in response to holding said second input (32/34/40/44) stationary; and
steering means (62) for powerably driving said second input (32/34/40/44) and thereby rotating said third one of said elements (20,22,24) of said first planetary mechanism (12) and said third one of said elements (40,42,44) of said third planetary mechanism (16) at different rates of output speed, said steering means (62) providing a single steering input power path to said first, second and third planetary mechanism (12,14,16) with said planetary mechanisms (12,14,16) being arranged on and interconnected solely along a common central axis (18).

18. A planetary steering differential (10) comprising:
first, second and third interconnected planetary mechanisms (12,14,16) individually having first, second and third planetary elements (20,22,24,30,32,34,40,42,44), one of said elements (20,22,24) of said first planetary mechanism (12) being a stationary reaction member, one of said elements (30,32,34,40,42,44) of said second and third planetary mechanisms (14,16) being a first input (30/34/40) and another one being a second input (32/34/40/44);
transmission means (56) for powerably driving said first input (30/34/40) and thereby rotating a third one of said elements (20,22,24) of said first planetary mechanism (12) and a third one of said elements (40,42,44) of said third planetary mechanism (16) at equal rates of output speed in response to holding said second input (32/34/40/44) stationary; and
steering means (62) for powerably driving said second input (32/34/40/44) and thereby rotating said third one of said elements (20,22,24) of said first planetary mechanism (12) and said third one of said elements (40,42,44) of said third planetary mechanism (16) at different rates of output speed, said steering means (62) providing solely a single steering input power path to said first, second and third planetary mechanisms (12,14,16) and wherein said third one of said elements (20,22,24) of said first planetary mechanism (12) and said third one of said elements (40,42,44) of said third planetary mechanism (16) are planet carriers.

19. The planetary sterring differential (10) of claim 17 wherein said transmission means (56) includes a reversible, multi-speed transmission (58) and said steering means (62) includes a hydraulic motor (66).

20. The planetary steering differential (10) of claim 19 wherein said second input (32/34/40/44) is the ring gear (40) of the third planetary mechanism (16) and is connected to said motor (66).

21. The planetary steering differential (10) of claim 20 wherein said third one of said elements (40, 42, 44) of said third planetary mechanism (16) is connected for joint rotation with said ring gear element (30) of said second planetary mechanism (14).

22. The planetary steering differential (10) of claim 21 wherein said first input (30/34/40) is the planet carrier (34) of said second planetary mechanism (14).

23. The planetary steering differential (10) of claim 17 wherein said sun gear elements (22,32) of said first and second planetary mechanisms (12,14) are interconnected for joint rotation.

24. The planetary steering differential (10) of claim 17 wherein said sun gear elements (32,34) of said second and third planetary mechanisms (14,16) are interconnected for joint rotation.

25. A planetary steering differential (10) comprising:
first, second and third interconnected planetary mechanisms (12,14,16) individually having first, second and third planetary elements (20,22,24,30,32,34,40,42,44), one of said elements (30,32,34,40,42,44) of said second and third planetary mechanisms (14,16) being a first input (30/34/40) and another one being a second input (32/34/40/44);
transmission means (56) for powerably driving said first input (30/34/40) and thereby rotating a third one of said elements (20,22,24) of said first planetary mechanism (12) and a third one of said elements (40,42,44) of said third planetary mechanism (16) at equal rates of output speed in response to holding said second input (32/34/40/44) stationary;
steering means (62) for powerably driving said second input (32/34/40/44) and thereby rotating said third one of said elements (20,22,24) of said first planetary mechanism (12) and said third one of said elements (40,42,44) of said third planetary mechanism (16) at different rates of output speed, said steering means (62) providing solely a single steering input power path to said first, second and third planetary mechanisms (12,14,16), and wherein said first second and third planetary elements (20,22,24) of said first planetary mechanism (12) are respectively a ring gear, a sun gear and a planet carrier, and wherein said ring gear (20) is held stationary.

26. The planetary steering differential (10) of claim 17 wherein one of said planetary elements (30, 32, 34) of said second planetary mechanism (14) is connected to one of said planetary elements (40, 42, 44) of said third planetary mechanism (16) for joint rotation.

27. The planetary steering differential (10) of claim 17 wherein said first input (30/34/40) is the planet cararier (34) of said second planetary mechanism (14) and said second input (32/34/40/44) is the ring gear (40) of said third planetary mechanism (16).

28. The planetary steering differential (10) of claim 1 wherein said first input "(32/34/40/44) is a"has been replaced by ring gear (30) of said second planetary mechanism (14) and said second input member (63) is connected for joint rotation with said sun gear (32) of said second planetary mechanism (14).

29. The planetary steering differential (10) of claim 1 wherein said first input member (57) is connected for joint rotation with said ring gear (40) of said third planetary mechanism (16) and said second input member (63) is connected for joint rotation with said (34) of said second planetary mechanism (14).

30. The planetary steering differential (10) of claim 1 wherein said first input member (57) is connected for joint rotation with said ring gear (30) of said second planetary mechanism (14) and said secon dinput member (63) is connected for joint rotation with said planet carrier (44) of said third planetary mechanism (16).

31. A planetary steering differential (10) comprising:
first, second and third interconnected planetary mechanisms (12,14,16) arranged on and being interconnected solely along a common axis (18) and individually having ring gear, sun gear and planet carrier elements (20,22,24,30,32, 34,40,42,44), a first one of said elements (20,22,24) of said first planetary mechanism (12) serving as a first output member (48) and a second one of said elements (20,22,24) of said first planetary mechanism (12) being continuously held stationary, and a first one of said elements (40,42,44) of said third planetary mechanism (16) serving as a second output member (52);
transmission means (56) for powerably driving a first one of said elements (30,32,34) of said second planetary mechanism (14) at a preselected speed and thereby rotating said output members (48,52) at equal rates of speed below said preselected speed through said first, second and third planetary mechanisms (12,14,16) in response to holding a second one of said elements (40,42,44) of said third planetary mechanism (16) stationary; and
infinitely variable ratio steering means (62) for powerably driving solely said second one of said elements (40,42,44) of said third planetary mechanism (16) and thereby rotating said output members (48,52) at different rates of speed through said first, second and third planetary mechanisms (12,14,16), said steering means (12) providing solely a single steering input power path.

32. The planetary steering differential (10) of claim 31 wherein said one of first elements (30, 32, 34) of said second planetary mechanism (14) is the planet carrier.

33. The planetary steering differential (10) of claim 32 wherein said another one of first elements (40, 42, 44) of said third planetary mechanism (16) is the ring gear.

34. The planetary steering differential (10) of claim 31 wherein said one of first elements (20, 22, 24) of said first planetary mechanism (12) and said first of said elements (40, 42, 44) of said third planetary mechanism (16) are the output planet carriers.

35. The planetary steering differential (10) of claim 31 wherein said ring gear (20) of said first planetary mechanism (12) is held stationary.

36. A planetary steering differential (10) comprising:
first, second and third interconnected planetary mechanisms (12,14,16) individually having ring gear, sun gear and planet carrier elements (20,22,24,30,32,34,40,42,44), a first one of said elements (20,22,24) of the first planetary mechanism (12) being a continuously stationary reaction member and a second one of said elements (20,22,24) of the first planetary mechanism (12) being a first output member, a first one of said elements (40,42,44) of the third planetary mechanism (16) being a second output member;
transmission means (56) for powerably driving a first one of said elements (30,32,34) of the second planetary mechanism (14) at a preselected speed and through the action of the first, second and third planetary mechanisms (12,14,16) rotating said output members at equal rates of speed below said preselected speed in response to holding one of the second and third elements (40,42,44) of the third planetary mechanism (16) stationary; and
steering means (62) for powerably driving said one of the second and third elements (40,42,44) of the third planetary mechanism (16) through a single steering input power path and thereby rotating said output members at different rates of speed and at an average speed rate below aid preselected speed.

37. A planetary steering differential (10) comprising:
first and second input members (57,63);
first and second output members (48,52);
planetary means (12,14,16) for rotating said first and second output members (48,52) in the same direction and at the same reduced rate of speed in response to rotation solely of said first input member (57) at a preselected speed and holding said second input member (63) stationary, and for rotating said first and second output members (48,52) at different speeds at an average speed rate below said preselected speed in response to rotation of said first and second input members (57,63), said planetary means (12,14,16) including first, second and third interconnected planetary mechanisms (12,14,16) individually having ring gear, sun gear and planet carrier elements (20,22,24,30,32,34,40,42,44), one of said elements (30,32,34,40,42,44) of said second and third planetary mechanisms (14,16) being connected to said first input member (57) and another one being connected to said second input member (63), said second input member (63) providing a single steering input power path to said planetary mechanisms (12,14,16), and wherein one of said planetary elements (20,22,24) of said first planetary mechanism (12) is a stationary reaction member.

38. The planetary steering differential (10) of claim 37 including transmission means (58) for powerably rotating said first input member (57) and steering motor means (62) for powerably rotating solely said second input member (63).

39. The planetary steering differential (10) of claim 38 wherein said one of said first planetary elements (20,22,24) of the first planetary mechanism (12) is a stationary ring gear.

40. A planetary steering differential (10) adapted to be driven by a transmission (56) and a steering unit (62), comprising:

a first planetary mechanism (12) having a first ring gear (20), a first sun gear (22) and a first planet carrier (24), one of said first ring gear (20) and first planet carrier (24) being continuously stationary and the other being a first output member;
a second planetary mechanism (14) having a second ring gear (30), a second sun gear (32) and a second planet carrier (34); and
a third planetary mechanism (16) having a third ring gear (40), a third sun gear (42) and a third planet carrier (44), the first, second and third sun gears (22,32,42) being connected for joint rotation the transmission (56) driving in use one of the second ring gear (30) and second planet carrier (34)
and the steering unit (62) driving in use one of the third ring gear (40) and third planet carrier (44) with the other being a second output member.

41. A planetary steering differential (10) comprising:
a hollow bevel gear member (74,76);
case means (70,78,80) for rotatably supporting the hollow bevel gear member (74,76) along a transverse axis (18);
a first planetary mechanism (12) having a ring gear (20), a sun gear (22), and a planet carrier (24) disposed on the axis (18) at one side of the bevel gear member (74,76) and the case means (70,78,80);
second and third interconnected planetary mechanisms (14,16) disposed on the axis (18) at the opposite side of the bevel gear member (74,76) and the case means (70,78,80) and individually having a ring gear (30,40) a sun gear (32,42) and a planet cararier (34,44), the second planetary mechanism (14) being driven by the bevel gear member (74,76); and
connecting means (38) for connecting said sun gears (22,32,42) of the first, second and third planetary mechanism (12,14,16) for joint rotation, the connecting means (38) extending through the hollow bevel gear member (74,76) on the axis (18).

* * * * *

UNITED STATES PATENT AND TRADEMARK OFFICE
CERTIFICATE OF CORRECTION

PATENT NO. : 4,434,680

DATED : March 6, 1984

INVENTOR(S) : Craig W. Riediger, et al

It is certified that error appears in the above-identified patent and that said Letters Patent are hereby corrected as shown below:

Column 10, line 50: delete "a".
Column 11, line 22: "(32,42)" should read --(34,44)--.
Column 12, line 51: "sterring" should read --steering--.
Column 13,
    line 43: "cararier" should read --carrier--;
    lines 48, 49:'"(32/34/40/44) is a" has been replaced by'
        should read --member (57) is connected for joint
        rotation with said--;
    line 57: "said (34)" should read --said planet carrier (34)--;
    line 62: "secon dinput" should read --second input--.

Column 14, line 32: "said another one of first elements" should read
        --said second one of said elements--;

line 36: "said first of" should read --said first one of--; and
    line 68: "aid" should read --said--.

Signed and Sealed this

Fourth Day of December 1984

[SEAL]

Attest:

GERALD J. MOSSINGHOFF

Attesting Officer     Commissioner of Patents and Trademarks